United States Patent
Boucadair et al.

(10) Patent No.: US 8,451,844 B2
(45) Date of Patent: May 28, 2013

(54) METHOD OF RECEIVING A DATA PACKET COMING FROM AN IPV4 DOMAIN IN AN IPV6 DOMAIN, AN ASSOCIATED DEVICE, AND ASSOCIATED ACCESS EQUIPMENT

(75) Inventors: Mohamed Boucadair, Rennes (FR); Jean-Luc Grimault, Mondeville (FR)

(73) Assignee: France Telecom, Paris (FR)

( * ) Notice: Subject to any disclaimer, the term of this patent is extended or adjusted under 35 U.S.C. 154(b) by 278 days.

(21) Appl. No.: 13/001,850

(22) PCT Filed: Jun. 16, 2009

(86) PCT No.: PCT/FR2009/051148
§ 371 (c)(1),
(2), (4) Date: Dec. 29, 2010

(87) PCT Pub. No.: WO2010/004156
PCT Pub. Date: Jan. 14, 2010

(65) Prior Publication Data
US 2011/0110374 A1     May 12, 2011

(30) Foreign Application Priority Data
Jun. 30, 2008 (FR) ..................... 08 54398

(51) Int. Cl.
H04L 12/28    (2006.01)
(52) U.S. Cl.
USPC .......................... 370/393; 370/401
(58) Field of Classification Search
USPC .................. 370/389, 392, 393, 401, 466
See application file for complete search history.

(56) References Cited

U.S. PATENT DOCUMENTS

| 7,245,622 B2* | 7/2007 | Huitema ................ 370/392 |
| 7,551,632 B2* | 6/2009 | Thubert et al. ............ 370/401 |
| 2005/0286553 A1* | 12/2005 | Wetterwald et al. ......... 370/466 |

FOREIGN PATENT DOCUMENTS

| EP | 1 420 559 A1 | 5/2004 |
| WO | WO 2004/039014 A1 | 5/2004 |
| WO | WO 2007/099248 A2 | 9/2007 |

OTHER PUBLICATIONS

Afifi et al., "Methods for IPv4-IPv6 Transition," IEEE International Symposium on Computers and Communications, Red Sea, Egypt Jul. 6-8, 1999, Proceedings, Los Alamitos, CA, USA, IEEE Comput. Soc., US, pp. 478-484 (Jul. 6, 1999).
Carpenter et al., "RFC 3056. Connection of IPv6 Domains via IPv4 Clouds," Network Group Request for Comments, pp. 1-23 (Feb. 1, 2001).
Park et al., "Network Address Translation—Protocol Translation (NAT-PT); draft-daniel-natpt-bis-01.txt," Internet Engineering Task Force, IETF, pp. 1-21 (Oct. 22, 2005).
Shin et al., "Ports Option Support in Dual Stack Transition Mechanism (DSTM)," The 6th International Conference on Advanced Communication Technology, Phoenix Park, Korea, Feb. 9-11, 2004, Piscataway, NJ, USA, IEEE, vol. 1, pp. 225-228 (Feb. 9, 2004).

* cited by examiner

Primary Examiner — Hong Cho
(74) Attorney, Agent, or Firm — Drinker Biddle & Reath LLP (57) ABSTRACT

A method of receiving a data packet from an IPv4 domain in an IPv6 domain, the data packet comprising an IPv4 destination address and a destination port number. The method comprises the following steps: constructing an IPv6 destination address by concatenating an operator prefix, the IPv4 destination address, and the destination port number; generating an IPv6 data packet from the IPv6 constructed destination address and the received IPv4 data packet; and routing the generated IPv6 data packet in the IPv6 domain using the IPv6 constructed destination address, the constructed address belonging to a range of IPv6 addresses routable to an interconnection equipment of the IPv6 domain with the IPv4 destination address.

10 Claims, 5 Drawing Sheets

METHOD OF RECEIVING A DATA PACKET COMING FROM AN IPV4 DOMAIN IN AN IPV6 DOMAIN, AN ASSOCIATED DEVICE, AND ASSOCIATED ACCESS EQUIPMENT

CROSS-REFERENCE TO RELATED APPLICATIONS

This application is the U.S. national phase of the International Patent Application No. PCT/FR2009/051148 filed Jun. 16, 2009, which claims the benefit of French Application No. 08 54398 filed Jun. 30, 2008, the entire content of which is incorporated herein by reference.

FIELD OF THE INVENTION

The field of the invention is that of telecommunications networks, in particular IP telecommunications networks transporting data packets from a source equipment identified by a source address to a destination equipment identified by a destination address.

BACKGROUND

This kind of telecommunications network combines a plurality of equipments, connections, and functions dedicated to transporting data coming from terminal equipments connected to the network. In particular, the transport functions may be implemented by activating routing and transmission protocols. A telecommunications network administered by an operator is also referred to as a domain.

An IP connectivity service provider deploys a dedicated architecture to enable terminal equipment users to be contacted. Access to the IP connectivity service is managed by the service provider using the telecommunications network of an operator to route data packets sent by the terminal equipments to their final destinations. In some circumstances, said service provider is also the telecommunications network operator.

This kind of service provider assigns an IP address, generally a public IP address, to a home gateway placed between a home network and the public network or IP domain of the operator. The home gateway generally assigns private IP addresses to the terminals of its home network.

Below, the expression "home gateway" refers to any equipment for interconnecting a private network and a network operated by a service provider, the private network being either a home network or a business network.

The network operated by the service providers is also referred to below as a public network.

Located on the path of data packets between a terminal of its private home network and the IP domain of the operator, the home gateway includes, as known in the art, a table in which it associates the private IP address and the port associated with that terminal with a public IP address of IPv4 type and, with a port of the same gateway on the public network.

This table is known to the person skilled in the art as a NAT (network address translation) table. There are different types of network address translation e.g. symmetrical, Full Cone, and Port Restricted.

It is commonly accepted in the IP service provider community that IPv4 public addresses are going to run out. To avoid this problem the community has in the past taken action leading to the definition of a new protocol known as the Internet Protocol version 6 (IPv6). This new version of the Internet Protocol provides a large number of IP addresses and a hierarchical routing mechanism offering improved performance. Providers are not indifferent to warnings recently emanating from the Internet Engineering Task Force (IETF), notably in reports presented to the Global Routing Operations Working Group (GROW) concerning the risk of the Internet Assigned Numbers Authority (IRNA) running out of IPv4 addresses by the end of 2010.

However, in practice, this solution of the Ipv6 protocol has not as yet been widely adopted by operators, for financial, strategic, and technical reasons linked to managing the complexity of transition and migration.

To limit the number of IPv4 public addresses necessary to provide an IP connectivity service to an installed base of clients, a solution known as Double NAT or Operator NAT has been proposed and implemented. It entails activating a NAT function within the telecommunications network of the operator so that the home gateways use a private address (instead of a public address) in their outgoing NAT tables. Thus the Operator NAT function translates home gateway private addresses into public addresses, which enables a service provider to economize on a non-negligible number of IPv4 public addresses required to provide the IP connectivity service.

The Operator NAT solution has drawbacks including:
IP data packet processing is made more complex; because of the introduction of a second level of address translation, data packets must be modified twice;
the necessity to adapt the implementation of conventional Application Level Gateway (ALG) signaling protocols such as the Domain Name System (DNS) protocol, the File Transfer Protocol (FTP), and the Session Initiation Protocol (SIP). Taking the SIP, for example, to keep the NAT table of a home gateway up to date, setting up and maintaining a voice over IP session requires frequent exchanges of signaling between the user terminal and the public network via re-registration requests so that the NAT sessions remain active; with Double NAT, such a mechanism must also be provided in the equipment hosting the Operator NAT function; furthermore, the public address and the public port actually being used for the terminal must be communicated to the SIP application;
the public telecommunications network operator offering a degraded IP connectivity service can only be deplored, in particular because functions such as port forwarding and DynDNS are not supported in Operator NAT.

What is more, such a solution cannot prevent, but can only delay, the phenomenon of IPv4 addresses running out. It is therefore necessary to provide for a changeover to IPv6 in the medium term. Such a changeover will necessarily lead to a period of transition during which IPv6 domains will have to interconnect with IPv4 domains. There is no provision in current networks for facilitating such interconnection efficiently, optimally, and without instantiation of additional states in the network nodes used to provide an IP connectivity service.

SUMMARY

The invention improves upon the above situation by means of a method of receiving a data packet coming from an IPv4 domain in an IPv6 domain. According to the invention, said data packet includes an IPv4 destination address and a destination port number and said method includes the following steps:
constructing an IPv6 destination address by concatenating an operator prefix, said IPv4 address, and the destination port number;

generating an IPv6 data packet from the IPv6 constructed destination address and the received IPv4 data packet; and routing the generated IPv6 data packet using the IPv6 constructed destination address, said constructed address belonging to a range of IPv6 addresses routable to an interconnection equipment of the IPv6 domain with the IPv4 destination address.

Thus the invention is based on an entirely novel and inventive approach to routing a data packet coming from an IPv4 in an IPv6 domain. When an IPv4 data packet enters the IPv6 domain, the invention enables the IPv6 domain access equipment to construct an IPv6 destination address routable in the IPv6 domain from the IPv4 destination address and the destination port and to generate an IPv6 data packet containing the constructed destination address. This IPv6 constructed destination address is routable in the IPv6 domain and contains the payload carried by the IPv4 data packet.

Clearly the invention requires the destination terminal to have an IPv4 address from which an IPv6 destination address can be constructed.

The invention also provides a method of sending a data packet from an IPv6 domain to an IPv4 destination address. According to the invention the packet includes an IPv6 destination address of the packet constructed by concatenating an operator prefix, the IPv4 destination address, and a destination port number and said method executes the following steps on reception of the data packet:

extracting the IPv4 destination address and the destination port number from the IPv6 destination address;

generating an IPv4 data packet from the IPv6 data packet, said packet including said IPv4 destination address, said destination port number; and routing the IPv4 data packet to its IPv4 destination.

The IPv6 data packet is routed in the IPv6 domain as far as an equipment interconnecting the IPv6 domain and an IPv4 domain. The method of the invention generates from this IPv6 data packet an IPv4 data packet that the IPv4 domain will be able to route to its destination.

With the mechanism of the invention for constructing an IPv6 address from an IPv4 address, it is possible to retrieve the IPv4 address on which the IPv6 constructed address is based. It is therefore not necessary to store a table for translating IPv4 addresses to IPv6 addresses or to maintain states relating to sessions in an equipment interconnecting the IPv4 and IPv6 domains. Thus the invention makes it possible to route an IPv4 data packet in the form of an IPv6 data packet via an equipment interconnecting the IPv6 domain with an IPv4 domain and to route the packet to its final destination using the payload contained in the packet received by said interconnecting equipment to its destination without having recourse to state tables that are laborious to maintain.

As a result of these the methods of the invention for receiving and sending a data packet employ a simple method of interconnecting IPv4 and IPv6 domains. By imposing the use of the IPv6 protocol to route IPv4 data, they further favor progressive migration from IPv4 domains to the IPv6 protocol.

Note that constructing the IPv6 data packet from the IPv4 data packet may consist in encapsulation or protocol translation. Conversely, the generation of the IPv4 data packet from the IPv6 data packet may be effected by packet de-encapsulation or protocol translation, depending on the method employed to construct the IPv6 data packet from the IPv4 data packet (encapsulation or protocol translation).

The method of the invention for receiving a data packet is advantageously used by a device for receiving a data packet coming from an IPv4 domain in an IPv6 domain, characterized in that said data packet includes an IPv4 destination address and an IPv4 destination port number and said device includes:

means for constructing an IPv6 destination address by concatenating an operator prefix, said IPv4 address, and the destination port number;

means for generating an IPv6 data packet from the IPv6 constructed destination address and the received IPv4 data packet; and means for routing the generated IPv6 data packet in the IPv6 domain using the IPv6 constructed destination address, said constructed address belonging to a range of IPv6 addresses routable to an interconnection equipment of the IPv6 domain with the IPv4 destination address.

The method of the invention for sending a data packet is advantageously used by a device for sending a data packet from an IPv6 domain to an IPv4 domain, characterized in that said packet including an IPv6 destination address of the packet constructed by concatenating an operator prefix, the IPv4 destination address, and a destination port number, said device, on reception of the data packet makes use of:

means for extracting the IPv4 destination address and the port number from the IPv6 destination address;

means for generating an IPv4 data packet from the IPv6 data packet, said packet including said IPv4 destination address and said destination port number; and means for routing the IPv4 data packet to its IPv4 destination.

The invention also provides access equipment to an IPv6 domain including an interface with at least one IPv4 domain. According to the invention, this kind of equipment includes:

a device according to the invention for receiving a data packet coming from an IPv4 domain in the IPv6 domain; and a device according to the invention for sending a data packet from an IPv6 domain to an IPv4 domain.

This kind of access equipment therefore interconnects the IPv6 domain to which it belongs and to a neighboring IPv4 domain. The neighboring IPv4 domain may be a public network managed by an operator or a private network, either a home network or a business network. Note that this access equipment may be a network equipment of any type, provided that it has a network interface between an IPv6 and an IPv4 domain. It may in particular be a user terminal such as a personal computer.

According to one aspect of the invention, the IPv4 domain is a public network and said access equipment includes first means for advertising to the IPv4 domain IPv4 addresses of network equipments connected to the IPv6 domain and second means for advertising in the IPv6 domain IPv6 addresses constructed from IPv4 addresses of the IPv4 domain.

The access equipment is a IPv4 public domain access node. The advertisements that it broadcasts indicate to the other equipments of its domain and to the IPv4 domain access nodes that the data packets comprising the advertised addresses must be sent to it.

According to another aspect of the invention, the IPv4 domain is a private network and the access equipment is a home gateway adapted to connect user terminals of the private network to the IPv6 domain.

By private network is meant any type of home or business network. A home gateway of the invention is necessarily a dual stack gateway, meaning that it is able to implement both the IPv4 protocol and the IPv6 protocol. According to the invention, the gateway may receive from its private network IPv4 data packets and use the IPv6 protocol to route them in the IPv6 domain, and as well send data packets received from the IPv6 domain to a terminal of its IPv4 private network.

According to another aspect of the invention, such a home gateway includes means for obtaining an IPv4 address, a range of authorized port numbers, and a range of authorized IPv6 addresses, said range of IPv6 addresses being constructed by concatenating an operator prefix, said IPv4 address, and the range of authorized IPv4 port numbers.

According to the invention, the home gateway has a range of IPv6 addresses that it may use to generate an IPv6 data packet from a data packet received from a user terminal of its private network. Conversely, it receives from the IPv6 domain IPv6 data packets comprising a IPv6 constructed destination address belonging to said range of addresses and routes the IPv4 data packet that it generates from the received IPv6 packet to the user terminal corresponding to the destination port number of the packet.

In one particular implementation of the invention, the steps of the methods of sending and receiving a data packet are determined by computer program instructions.

Consequently, the invention also provides a computer program on an information medium, adapted to be executed in a sending, receiving or routing device or more generally in a computer, this program including instructions for executing the steps of a sending, receiving or routing method as described above.

This program may use any programming language and take the form of source code, object code or a code intermediate between source code and object code, such as a partially-compiled form, or any other desirable form.

The invention also provides a computer-readable information medium containing instructions of a computer program as referred to above.

The information medium may be any entity or device capable of storing the program. For example, the medium may include storage means, such as a ROM, for example a CD ROM or a micro-electronic circuit ROM, or magnetic storage means, for example a floppy disk or a hard disk.

Moreover, the information medium may be a transmissible medium such as an electrical or optical signal, which may be routed via an electrical or optical cable, by radio or by other means. The program of the invention can in particular be downloaded over an Internet-type network.

Alternatively, the information medium may be an integrated circuit in which the program is incorporated, the circuit being adapted to execute the method in question or to be used in its execution

BRIEF DESCRIPTION OF THE DRAWINGS

Other advantages and features of the invention become more clearly apparent on reading the following description of one particular implementation of the invention, provided by way of illustrative and non-limiting example only, and the appended drawings, in which.

DETAILED DESCRIPTION

The general principle of the invention relies on constructing an IPv6 address from an IPv4 address, a predetermined operator prefix, and a port number. This enables transformation of an IPv4 packet entering an IPv6 domain and an IPv6 packet leaving an IPv6 domain to go to an IPv4 domain without it being necessary to maintain a table of correspondence between the IPv4 and IPv6 addresses in an access node to the IPv6 domain.

It will be recalled that IPv6 addresses comprise 16 bytes (128 bits), compared to the 4 bytes (32 bits) of IPv4 addresses. There is therefore an extremely large potential number of IPv6 addresses compared to the number of IPv4 addresses. An IPv6 address has two parts:
- a left-hand part (the prefix) that identifies a subnetwork of the domain;
- a right-hand part that identifies a machine connected to the subnetwork.

The longest prefixes assigned to a subnetwork are generally "/64" prefixes, i.e. contain 64 bits for identifying the subnetwork. The right-hand 64 bits of the address are then used to identify a particular machine belonging to the subnetwork. Shorter prefixes (for example "/56" or even "/48") enable identification of larger subnetworks, themselves often including "/64" subnetworks. Nevertheless, there is nothing in the IPv6 standard to prohibit the use of prefixes longer than "/64" and it is therefore possible to conceive of a "/116" prefix, for example, identifying a subnetwork that may include 4096 machines.

Note that the only restriction on prefixes longer than "/64" is simply that the machines behind the corresponding subnetwork will not be able to use the autoconfiguration mechanism described in the document RFC 2462. That mechanism enables a machine knowing its level 2 address (for example its MAC Ethernet address) to configure for itself, subject to certain conditions, the right-hand 64 bits of its IPv6 address, deriving its level 2 address therefrom using a precise algorithm. This autoconfiguration mechanism is not obligatory, however, and other mechanisms may be preferable, for example that corresponding to the DHCPv6 protocol (see RFC 3315) that among other things makes it possible to obtain an IPv6 address from a DHCPv6 server.

Turning now from a simple IPv6 machine to an IPv6 router (for example an IPv6 home gateway), it is known that such an equipment must have one or more IPv6 prefixes representing the subnetworks whose packets it routes. An IPv6 router must therefore be configured with one or more prefixes.

An extension of the DHCPv6 protocol enables a router requiring one or more IPv6 prefixes (for example a home gateway) to request them from an equipment that is able to delegate prefixes (typically an upstream router). This extension is described in RFC 3633 (IPv6 Prefix Options for Dynamic Host Configuration Protocol (DHCP) version 6) and specifies an identity association for a prefix delegation option in DHCPv6 messages for passing on the delegated prefix or prefixes. Once the requesting router has been delegated one or more IPv6 prefixes, it routes all IPv6 packets going to or coming from machines whose addresses are inscribed the prefix or prefixes that it manages.

There is described below with reference to FIG. 1 an IPv6 domain 1 including an IPv6/IPv4 access node 40 to an IPv4 domain 3 and an access router 30 adapted to route data packets going to or coming from a home gateway 20 connected to the IPv6 domain 1. This kind of gateway administers a private home network 2 to which the terminals 21 and 22 are connected.

In the context of the invention, a dual-stack (DS) home gateway is considered, i.e. a home gateway that has activated both of the IPv4 and IPv6 protocol stacks. Accordingly, such a gateway is able to process (in particular to send and receive) only IPv4 or IPv6 data packets.

The terminals 21 and 22 may be dual-stack (IPv4 and IPv6) or mono-version IPv6 (or pure IPv6) terminals. How the invention enables interconnection of an IPv6 domain and at least one IPv4 domain for IPv6 terminals is described below.

The following "hybrid" circumstances are considered:
routing an incoming IPv4 data packet sent by a user terminal of the IPv4 domain 3 to a user terminal 21, 22 of the home network 2 of the gateway 20 connected to the IPv6 domain 1; and
routing an incoming IPv4 data packet sent by a user terminal 21, 22 of the IPv4 private domain 2 of the gateway to a user terminal of the IPv4 domain 3.

The details of sending pure IPv6 or pure IPv4 packets being known to the person skilled in the art, they are not described in more detail here.

To be able to connect to the IPv6 domain or network, the home gateway 20 has IP connectivity elements provided by the connectivity service provider.

However, note that the invention is not limited to access to the IP connectivity service (Internet or Intranet, for example) via a home gateway, but also applies to user terminals in other Internet or Intranet network access contexts. One example is access from a simple mobile terminal of a mobile network or from a sophisticated mobile terminal that could serve as a gateway, communicating with other terminals in its local area network, for example via Bluetooth.

According to the invention, the home gateway 20 has the following IP connectivity elements:
a standard IPv4 address below designated "@IPv4"; if the gateway hosts in its home network pure IPv6 client terminals, this IPv4 address is referred to as a "dummy" address because it is not used by the gateway to send/receive IP traffic;
a range of authorized port numbers (ports_pattern/length_of_unvariable);
a IPv6 constructed address prefix (IPv6_prefix_ports_range); and
a native IPv6 address prefix (IPv6_prefix_native); this second prefix is not mandatory, however; the IPv6 constructed prefix is sufficient on its own.

The @IPv4, IPv6_prefix_ports_range and IPv6_prefix_native elements are standard information elements in the usual IPv4 and IPv6 context.

According to the invention, the information element IPv6_prefix_ports_range intrinsically contains the elements @IPv4 and ports_pattern/length_of_unvariable.

In one implementation of the invention, the IPv4 address @IPv4 is an address shared@IPv4 that is shared by a plurality of home gateways of the IPv6 domain 1 and the range of authorized port numbers for the home gateway 20 is a range of port numbers reserved for that gateway.

Clearly sharing the public address shared@IPv4 between home gateways makes it possible to economize on the number of IPv4 addresses used and to delay the phenomenon of running out of addresses. Moreover, its use is justified by the need to interconnect IPv4 domains and IPv6 domains. This interconnection is generally effected by means of representation addresses. If the installed base of IPv6 clients is large, then many IPv4 representation addresses are required.

The various home gateways that share the same address shared@IPv4 are uniquely identified by the port numbers that they use as each of them has the benefit of a range of contiguous port numbers, undoubtedly small, but nevertheless reserved to it.

The invention proposes interconnecting IPv6 and IPv4 domains in a manner that requires the assignment of IPv4 addresses to function and thus ensures in a transparent manner continuity of connectivity between heterogeneous terminals (i.e. IPv4 and IPv6).

An advantage of the implementation of the invention in which the IPv4 addresses are shared is therefore to facilitate migration to IPv6 addressing at the same time as economizing on IPv4 addresses. In a context of transition between the IPv4 and IPv6 addressing modes, this can advantageously make it possible to avoid a penury of addresses until migration is completed. Another advantage is an immediate return on the investment in IPv6 plant (because the use of IPv6 capacity depends not on the behavior of the clients but on the operator).

In the remainder of the description the IPv4 address assigned to the gateway 20 is a shared address shared@IPv4.

Figure 1:
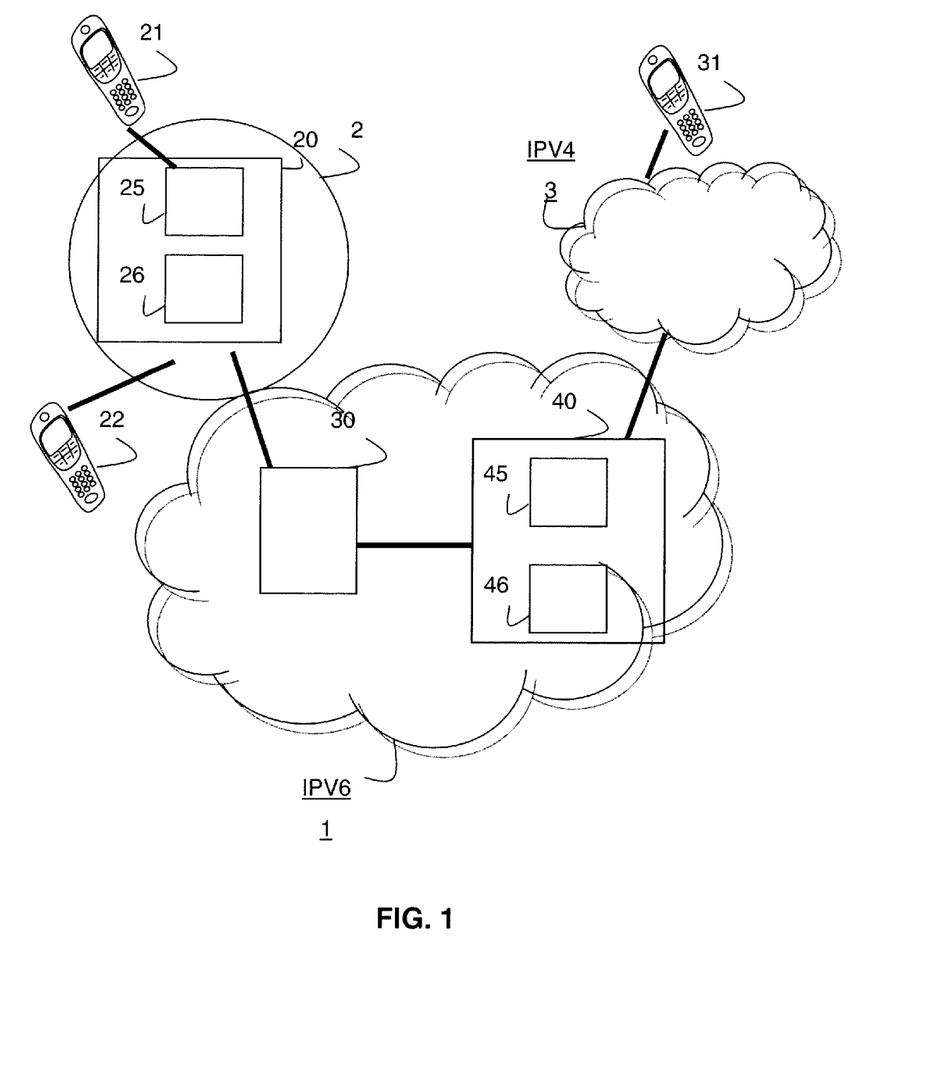
FIG. 1 shows diagrammatically an IPv6 domain and an IPv4 domain interconnected according to the invention.

Referring to FIG. 1, the home gateway 20 is connected to the IPv6 network or domain of the operator by a dual-stack (DS) access router 30. This is the first router that the IPv6 and IPv4 data packets encounter when they leave the home gateway. Note that this configuration is given by way of example only. A DS home gateway may instead be interconnected with an IPv4 first access router and an IPv6 second access router. There is considered below a DS access router 30 like that from FIG. 1.

According to the network architecture adopted at the IPv6 routing level, the access router 30 may advertise in the upstream direction of the network (i.e. towards the network 1 of the IP connectivity service provider) the IPv6 prefixes that it routes, i.e. the prefixes IPv6_prefix_ports_range and IPv6_prefix_native of the home gateways that it serves.

The access router 30 obtains the IPv6 prefixes of the home gateways that it serves in a manner that is entirely conventional in an IPv6 network environment. Two methods are described below:

1) it receives IPv6 routing advertisements (IPv6_prefix_ports_range and IPv6_prefix_native) from the home gateways that it serves; to this end each home gateway advertises its prefixes (IPv6_prefix_ports_range and IPv6_prefix_native) in the upstream direction; or 2) it obtains IPv6_prefix_ports_range and IPv6_prefix_native by prefix delegation as described in RFC 3633 (IPv6 Prefix Options For Dynamic Host Configuration Protocol (DHCP) version 6).

Figure 2:
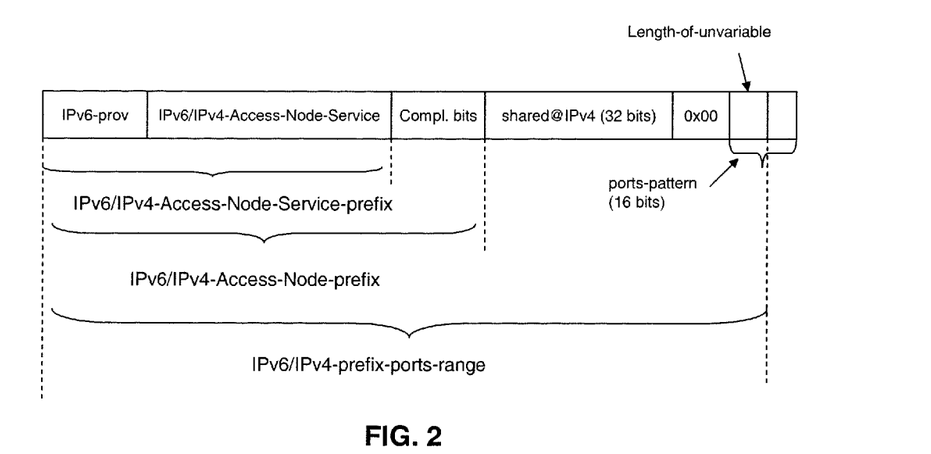
FIG. 2 shows the structure of an IPv6 address prefix constructed according to the invention.

An example of an IPv6 address prefix constructed in accordance with the invention, such as the prefix IPv6_prefix_ports_range assigned to the home gateway 20, is described below with reference to FIG. 2.

This IPv6 prefix combines the bits of the IPv4 public address shared_@IPv4 and the range of authorized port numbers (ports_pattern/length_of_unvariable) for the gateway 20 and makes it possible to route the incoming IPv6 packet to the destination home gateway unambiguously. It is an IPv6 prefix that is routable in an IPv6 network. It could even be routed in the IPv6 network if it were chosen to be a prefix inscribed in the prefix of the network operator providing the home gateway (especially if it were advertised in the Border Gateway Protocol (BGP)). In the FIG. 2 example, this prefix comprises, from left to right:

the IPv6 prefix assigned to the access node 40: IPv6/IPv4_Access_Node_prefix; this prefix is advantageously chosen so that it is inscribed in the IPv6 operator prefix IPv6-prov assigned to the IP connectivity service provider by its Regional Internet Registry (RIR) and thus includes this operator prefix in its first bits;

the bits IPv6/IPv4_Access_Node_Service identifying to the operator the interconnection service IPv6/IPv4_Access_Node in accordance with the present invention; the sequence made up of the bits of the operator prefix followed by the bits of IPv6/IPv4_Access_Node_Service constitute the prefix IPv6/IPv4_Access_Node_Service_prefix that identifies the service;

complementary bits identifying a particular access node IPv6/IPv4_Access_Node serving the home gateway; for load-balancing reasons, the prefix IPv6/IPv4_Access_Node_prefix may not be specific to only one access node;

the 32 bits of the address Shared_@IPv4 of the gateway 20;

optionally, 8 reserved bits set to 0; this byte may be used to distinguish between the different types of port (UDP, TCP, SCTP, etc.); it could take the value "X" for UDP processing, "Y" for TCP processing, etc.;

the 16 bits representing the range of port numbers authorized for the gateway (ports_pattern), with an invariant part on the left in these 16 bits (the more significant bits), of length length_of_unvariable; note that if the IPv4 address of the gateway 20 is not shared by a plurality of home gateways, the range of authorized port numbers is of maximum and identical size for all the gateways.

The length of the prefix IPv6_prefix_ports_range is established as follows: 128−16(length of an IPv6 address−port coding address)=112 bits plus length_of_unvariable (length of invariant bits representing the range of authorized source ports).

Note that the prefix IPv6_prefix_ports_range constructed according to the invention is longer than the prefixes recommended by the IPv6 standard for IPv6 deployment. It nevertheless conforms to the IPv6 standards.

The IPv6 domain 1 described with reference to FIG. 1 includes at least one access node 40 of the invention. Note that it may include other access nodes of the invention. The access node 40 (IPv6/IPv4_Access_Node) is a particular Dual-Stack (IPv4 and IPv6) router. In one implementation of the invention, it includes devices for routing an incoming IPv4 data packet from the IPv4 network 3 going to the network 1 and an outgoing IPv6 packet from the network 2 going to a destination in the IPv4 domain 3.

In the network 1, the access node 40 (IPv6/IPv4_Access_Node) is typically upstream of the access router or routers 30 (i.e. towards the network core in an interconnection segment with adjacent networks), as shown in FIG. 1.

Figure 3:
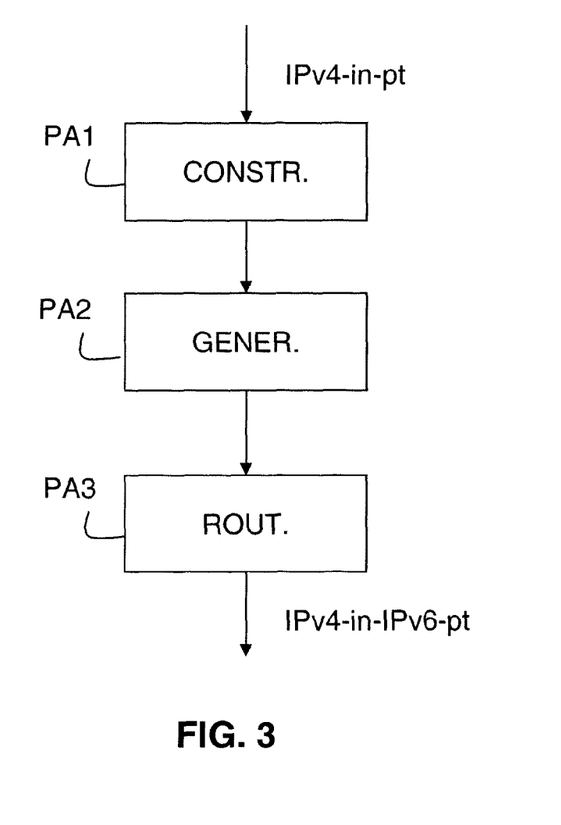
FIG. 3 shows diagrammatically steps of the method of the invention of receiving data packets coming from an IPv4 domain in an IPv6 domain.

The method of receiving a data packet coming from an IPv4 domain in an IPv6 domain is described below with reference to FIG. 3. The FIG. 3 example considers a data packet IPv4-in-pt entering an IPv6 domain from an IPv4 domain and going to a user terminal of the IPv6 domain 1, for example the terminal 21. The terminal is behind the home gateway 20 that has an IPv4 address @IPv4 or shared@IPv4 and a range of authorized ports_pattern/length_of_unvariable.

The incoming packet IPv4-in-pt, if it is going to the user terminal 21 of the home network of the home gateway 20, comprises an IPv4 destination address equal to shared@IPv4 and a destination port inscribed in the ports range ports_pattern/length_of_unvariable of the hone gateway 20.

As mentioned above with reference to FIG. 2, the address shared@IPv4 and the range of port numbers ports_pattern/length_of_unvariable are located in the prefix IPv6_prefix_ports_range of the home gateway 20.

The packet IPv4-in-pt is received by the access node 40, which uses the receiving method of the invention. In a preliminary step, the IP connectivity provider advertised to the IPv4 domains with which it has an interface the IPv4 addresses assigned to home gateways of the domain 1 to which it is responsible for routing the IPv4 packets. It advertised this either via the access node 40 itself or an autonomous system board router (ASBR) using a technique known to the person skilled in the art.

Figure 4:
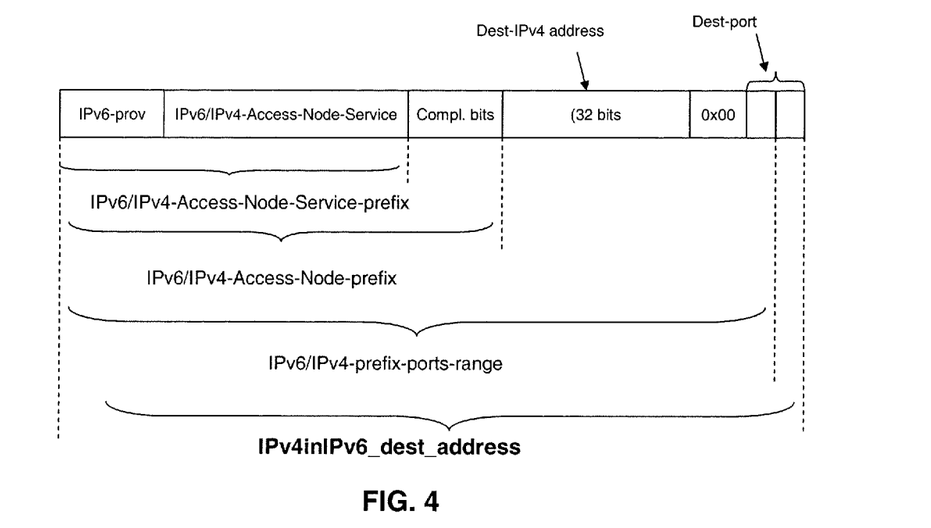
FIG. 4 shows the structure of an IPv6 address constructed according to the invention from an IPv4 address and a destination port.

The packet IPv4-in-pt comprises a destination address @IPv4 or shared@IPv4 managed by the access node 40 and a destination port dest-port. According to the invention, the receiving method includes a step PA1 of constructing an IPv6 destination address IPv4inIPv6_dest_address by concatenating a prefix IPv6/IPv4_Access_Node_prefix of the access node 40, said IPv4 destination address shared@IPv4, and the destination port number dest-port, as described with reference to FIG. 4. The destination port number dest-port is inserted in the right-hand part of the IPv6 constructed destination address. The receiving method of the invention thus inserts both the 32 bits of the destination IPv4 address of the received IPv4 packet and the 16 bits of the destination port dest-port to constitute a constructed destination IPv6 address that is referred to as IPv4inIPv6_dest_address.

In a step PA2, the receiving device of the invention generates an IPv6 data packet IPv4inIPv6-pt from the IPv6 constructed destination address IPv4inIPv6_dest_address and the received IPv4 data packet. One implementation of the invention encapsulates the received IPv4 packet in an IPv6 packet:

the IPv6 source address of which is one of the IPv6 addresses that IPv6/IPv4_Access_Node 40 owns (for one of its interfaces); and whose IPv6 destination address is the address IPv4inIPv6_dest_address.

Another implementation translates the received IPv4 packet IPv4-in-pt into an IPv6 packet with which is associated the construct IPv6 address after previously extracting from the received IPv4 packet its destination IPv4 address, its destination port, its sort IPv4 address, and its source port. Note, however, that if the final destination of the data packet is an IPv4 terminal 21, 22 of the home network 2 of the gateway 20, only the encapsulation is valid. The translation applies when the data packet is going to an IPv6 terminal of the home network 2.

In step PA3, the IPv6 data packet IPv4inIPv6-pt generated using the IPv6 constructed destination address is routed in the IPv6 domain 1. the packet IPv4inIPv6-pt therefore enters the IPv6 routing core of the access node IPv6/IPv4_Access_Node 40.

By construction, its destination address IPv4inIPv6_dest_address is inscribed in the prefix IPv6_prefix_ports_range of the home gateway 20. The packet IPv4inIPv6-pt is routed to the interface of the access node IPv6/IPv4_Access_Node 40 that serves the corresponding IPv6 route to the home gateway 20.

Note that if the destination address IPv4inIPv6_dest_address is not inscribed in any prefix IPv6_prefix_ports_range (or any encompassing prefix), the packet would be destroyed en route, because it could not be routed to any prefix IPv6_prefix_ports_range and thus to any home gateway.

If the destination address IPv4inIPv6_dest_address is inscribed in the prefix IPv6_prefix_ports_range, the packet IPv4inIPv6-pt reaches the dual-stack access router 30 serving the home gateway 20 that hosts the user terminal 21 in its home network 2. It is routed by the dual-stack access router 30 to the home gateway, which knows the route to the prefix IPv6_prefix_ports_range.

In one implementation of the invention, the home gateway 20 includes a device using the method of the invention of sending the data packet IPv4inIPv6-pt. A method of this kind is described below with reference to FIG. 5.

Figure 5:
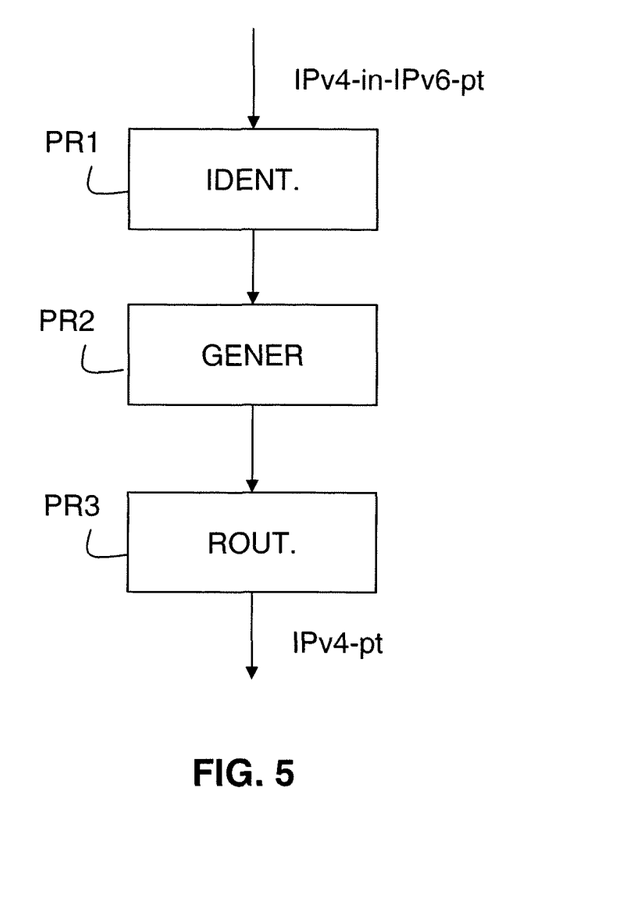
FIG. 5 shows diagrammatically the steps of the method of the invention of sending a data packet from an IPv6 domain to an IPv4 destination address.

When the packet IPv4inIPv6-pt reaches the home gateway 20, the gateway determines whether it is a standard IPv6 packet or an IPv6 packet encapsulating an IPv4 packet using the header of the received packet (in particular the bits identifying the prefix Ipv6/Ipv4_Access_Node_Service_prefix).

If it is an IPv6 packet encapsulating an IPv4 packet, the sending method includes a first step PR1 of generating an IPv4 packet from the received IPv6 packet. This may entail de-encapsulating the IPv4 packet contained in the packet IPv4inIPv6-pt. Such de-encapsulation yields the packet IPv4-in-pt initially sent by the sender terminal in the IPv4 domain 3 and, in particular, its destination port number dest-port. In this situation, the method includes a step PR2 of verifying that this destination port number dest-port belongs to the range of port numbers ports_pattern/length_of_unvariable authorized for the gateway 20. Note that this kind of verification is of particular benefit if the IPv4 address of the home gateway is a shared address shared@IPv4 and the range of port numbers reserved for the gateway 20 is small.

If the result of this verification is positive, a step PR3 of routing the data packet IPv4-in-pt to the user terminal 21 is executed in the known standard manner.

Note that an internal network address translation (NAT) device is often included in this kind of home gateway if it serves a plurality of user terminals 21, 22 in its home network. The packet IPv4-in-pt received from the outside is then processed by the internal NAT of the home gateway 20 and re-transmitted to the final destination terminal 21 in the home network.

Clearly an encapsulated data packet represents a first phase of migrating to IPv6 addressing. It enables routing of IPv4 packets under the IPv6 protocol in the IPv6 domain 1, but after de-encapsulation the IPv4 packets are received and processed under the IPv4 protocol, which makes it necessary for the home gateway 20 to be able to manage an IPv4 address.

If the IPv6 packet is not one encapsulating an IPv4 packet, but an IPv6 packet obtained by translating the data packet IPv4-in-pt, the home gateway 20 routes the IPv6 packet in the standard manner to the destination terminal. Clearly this situation represents a second migration phase, no longer imposing a dual-stack terminal.

According to one aspect of the invention, an IPv6 address replacement step may be executed by the gateway, consisting in replacing the constructed destination address IPv4inIPv6_dest_address with a native address IPv6_address_native-UE of the terminal 21. This is of benefit if the data packet IPv4-in-pt is part of a response to a data packet sent beforehand by the destination terminal 21 with its IPv6 native source address and for which the gateway had advantageously stored this native address in its NAT table before sending it. At that moment, it replaced the native address with the constructed address of the terminal 21 to enable the access node 40 to extract an IPv4 source address from it when transforming the outgoing IPv6 into an IPv4 packet.

Consider next setting up an outgoing call to an IPv4 destination, for example an IPV4 web server on the Internet. A user terminal of the home network 2, for example an IPv6 PC 22 of the gateway 20, sends a data packet to this IPv4 party 3. The application running on the PC in this situation is an IPv6 browser. The source user terminal 22 may be a DS terminal or a pure IPv6 terminal. Consider the situation in which the terminal 22 sends IPv4 data packets.

On reception of the IPv4 data packet, the home gateway 20 executes the method of the invention of receiving a data packet, described above with reference to FIG. 3. It therefore constructs source and destination IPv6 addresses and generates an IPv6 data packet using the mechanism described with reference to FIG. 4. Note that the composition of an IPv6 source address is subject to the same rules as that of an IPv6 destination address. It furthermore extracts its source port number and, if necessary, replaces it with a port number belonging to the range of authorized port numbers assigned to it. It then routes the IPv6 packet constructed in this way to the router 30.

Before being routed to its final destination, the IPv4 packet must be extracted from the IPv6 packet by a particular equipment of the network responsible for the converse operation, for example the access node 40, which then executes the data packet sending method already described with reference to FIG. 5.

Using the invention, a home gateway can be connected only in IPv6 to the domain 1 and the access router dual stack access router 30 can only be IPv6 (Ipv6_access_router).

Figure 6A:
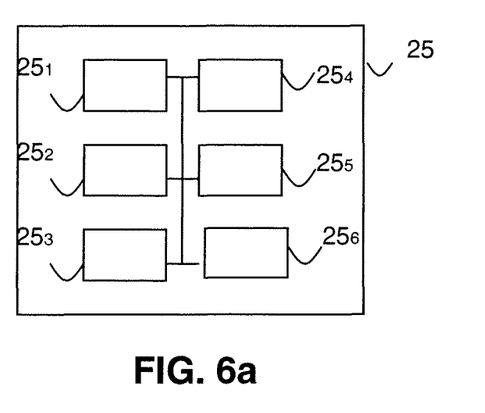
FIG. 6*a* shows diagrammatically the structure of a device of the invention for receiving from an IPv4 domain in an IPv6 domain.

In the example described with reference to FIG. 1, the home gateway 20 and the access node 40 of the invention include a device 25 that is described below with reference to FIG. 6*a* for receiving a data packet. It includes the hardware elements conventionally found in a standard computer or a dedicated router, namely a processor 25$_1$, a random-access memory (RAM) 25$_2$, a read-only memory (ROM) 25$_3$, and telecommunications means 25$_4$ for communicating with the network 1.

According to the invention, the device 25 includes a memory 25$_5$ containing a database in which is stored an address translation table (NAT table) for translating addresses between the domain 1 and its home network 3.

Note that this memory may equally well be external to the device 25 provided that said device can access it.

The read-only memory 25$_5$ constitutes a storage medium of the invention that stores the computer program of the invention. The program includes instructions for executing the steps of the method of the invention of receiving a data packet described above with reference to FIG. 3.

Figure 6B:
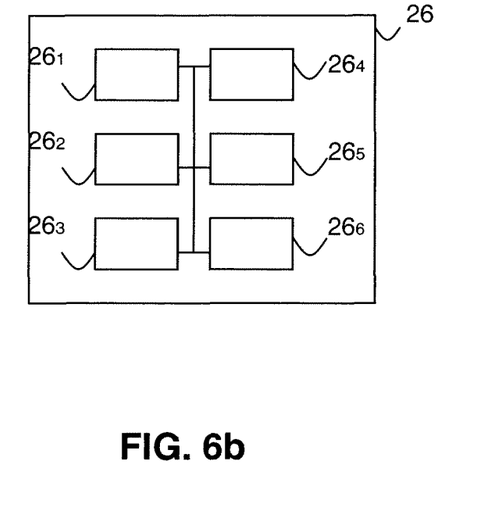
FIG. 6*b* shows diagrammatically the structure of a device of the invention for sending from an IPv6 domain to an IPv4 destination address.

The home gateway 20 and the access node 40 of the invention further include a device 26 that is described below with reference to FIG. 6*b* for sending a leaving packet. It includes the hardware elements conventionally found in a standard computer or a dedicated router, namely a processor 26$_1$, a random-access memory (RAM) 26$_2$, a read-only memory (ROM) 26$_3$, and telecommunications means 26$_4$ for communicating with the network 1.

According to the invention, the device 26 includes a memory 26$_5$ that may contain, for the home gateway, a database in which is stored an address translation table (NAT table) for translating addresses between the domain 1 and its home network 3.

Note that this memory may equally well be external to the device 26 provided that said device can access it.

The read-only memory $26_5$ constitutes a storage medium of the invention that stores the computer program of the invention. The program includes instructions for executing the steps of the method of the invention of sending a data packet described above with reference to FIG. 5.

Note that the devices 25, 26 respectively using the receiving and sending methods described above for the home gateway 20 and the access node 40 may be combined in a single device adapted to implement both the receiving method and the sending method of the invention.

Note also that these devices may equally well be included in a user terminal connected directly to the network 1 of the connectivity service provider.

Note that the invention is not limited to the FIG. 1 example, as the devices 25 and 26 may very well be implemented on a computer or any other equipment of the network 1.

To summarize, the invention makes possible a first phase of migration of IP connectivity services towards IPv6 using packet routing mechanisms that takes the following factors into account:

Service operators suffer a problem of running out of IPv4 addresses.

The final migration to IPv6 will take a plurality of years (10 years minimum), mainly because of the large number of participants to "convince" to go over to IPv6, the large number of autonomous systems (AS), and the diversity of interconnection mechanisms. Moreover, it should be pointed out that the address problem is a priori of concern only to operators. Clients have no reason to modify the architecture of their local networks, in particular its FTP, HTTP, etc. servers, to IPv6. Operators must expect a long haul to assist clients with the changeover to IPv6.

Simply migrating a given domain to IPv6 does not solve the problem of global connectivity (contacting any remote machine present on the Internet). Interconnection with the IPv4 world must therefore be provided.

A solution based on NAT-PT that is not stateless is not to be recommended. This would degrade the service provided as value-added services linked to port forwarding configured by clients would not work The mechanisms of the invention for routing IP packets make it possible to encourage the use of the IPv6 protocol by activating IPv6 and providing a solution making it possible to encourage IPv6 traffic based on a stateless interconnection function placed in the network. The solution of the invention uses dual-stack (DS) user terminals and home gateways (i.e. user terminals and home gateways that have activated both the IPv4 and IPv6 protocol stacks). Because of this, these equipments are in a position to process (send and receive) IPv4 and IPv6 messages.

This step proposes assigning the same IPv4 address to a plurality of gateways, which is advantageous and further makes it possible to economies on IPv4 addresses. To distinguish between home gateways sharing the same IPv4 address:
  a range of authorized source ports is assigned each gateway (or other equipments in context other than home internet access) for outgoing calls;
  a particular IPv6 prefix IPv6_prefix_ports_range (englobing the IPv4 address and the range of ports) is placed in the incoming IPv6 routing chain towards the home gateway.

For incoming IPv4 calls, an IPv4/IPv6 interconnection equipment or access node is inserted into the path via dedicated advertisements under the interior gateway protocol (IGP) or the border gateway protocol (BGP). On reception of an IPv4 packet, it constructs a destination IPv6 address on the basis of the destination IPv4 information (address and port) and encapsulate the received IPv4 packet in an IPv6 packet having that destination address. If the IPv4 packet is addressed to a particular home gateway X, the IPv6 constructed address is in fact encompassed in the IPv6_prefix_ports_range of the home gateway X. This will receive the IPv6 packet encapsulating the IPv4 packet fabricated by the access node. On its reception, it will de-encapsulate this packet to obtain the IPv4 packet contained it is and route it normally in its LAN to the equipment concerned.

For outgoing calls, the terminals may use their shared IPv4 address or their IPv6 (native or constructed) addresses. If the IPv4 address is used, then the home gateway constrains the source port number so as to be inscribed in the authorized range. The packet is routed under IPv4 in the normal way to its final destination. If the remote machine generates a response to this packet, then the generated response packet is intercepted by the access node (using IGP/BGP routing advertisements), which proceeds to carry out the processing of the invention.

The invention claimed is:

1. A method of receiving a data packet from an IPv4 domain in an IPv6 domain, said data packet comprising an IPv4 destination address and a destination port number, said method comprising the following steps:
  constructing an IPv6 destination address by concatenating an operator prefix, said IPv4 destination address, and the destination port number;
  generating an IPv6 data packet from the IPv6 constructed destination address and the received IPv4 packet; and
  routing the generated IPv6 data packet in the IPv6 domain using the IPv6 constructed destination address, said constructed address belonging to a range of IPv6 addresses routable to an interconnection equipment of the IPv6 domain with the IPv4 destination address.

2. A non-transitory computer program product that is at least one of downloadable from a communications network and stored on a computer-readable medium and executable by a microprocessor, comprising program code instructions for executing the method according to claim 1 of receiving in an IPv6 domain a data packet from an IPv4 domain.

3. A method of sending a data packet from an IPv6 domain to a destination address of an IPv4 domain, said packet comprising an IPv6 destination address of the packet constructed by concatenating an operator prefix, the IPv4 destination address, and a destination port number, said method executing the following steps on reception of the data packet:
  extracting the IPv4 destination address and the destination port number from the IPv6 destination address;
  generating an IPv4 data packet from the IPv6 data packet, said packet including said IPv4 destination address and said destination port number; and
  routing the IPv4 data packet to its IPv4 destination.

4. A non-transitory computer program product that is at least one of downloadable from a communications network and/or stored on a computer-readable medium and/or executable by a microprocessor, comprising program code instructions for executing the method according to claim 3 of sending a data packet from an IPv6 domain to a destination address of an IPv4 domain.

5. A device for receiving a data packet from an IPv4 domain in an IPv6 domain, said data packet comprising an IPv4 destination address and an IPv4 destination port number, said device comprising:
- means for constructing an IPv6 destination address by concatenating an operator prefix, said IPv4 destination address, and the destination port number;
- means for generating an IPv6 data packet from the IPv6 constructed destination address and the received IPv4 packet; and
- means for routing the generated IPv6 data packet in the IPv6 domain using the IPv6 constructed destination address, said constructed address belonging to a range of IPv6 addresses routable to an interconnection equipment of the IPv6 domain with the IPv4 destination address.

6. Access equipment to an IPv6 domain comprising an interface with at least one IPv4 domain, further comprising:
- a device according to claim 5 for receiving a data packet coming from an IPv4 domain in the IPv6 domain; and
- a device for sending a data packet from an IPv6 domain to an IPv4 domain, said packet comprising an IPv6 destination address of the packet constructed by concatenating an operator prefix, the IPv4 destination address, and a destination port number, said device, on reception of the data packet, making use of:
- means for extracting the IPv4 destination address and the destination port number from the IPv6 destination address;
- means for generating an IPv4 data packet from the IPv6 data packet, said packet including said IPv4 destination address and said destination port number; and
- means for routing the IPv4 data packet to its IPv4 destination.

7. IPv6 domain access equipment according to claim 6, wherein the IPv4 is a public network, said equipment comprising first means for advertising to the IPv4 domain IPv4 addresses of network equipments connected to the IPv6 domain and second means for advertising in the IPv6 domain IPv6 addresses constructed from IPv4 addresses of the IPv4 domain.

8. IPv6 domain access equipment according to claim 6, wherein the IPv4 domain is a private network, the access equipment is a home gateway adapted to connect user terminals of the private network to the IPv6 domain.

9. IPv6 domain access equipment according to claim 8, comprising means for obtaining an IPv4 address, a range of port numbers, and a range of authorized IPv6 addresses, said range of IPv6 addresses being constructed by concatenating an operator prefix, said IPv4 address, and the range of authorized IPv4 port numbers.

10. A device for sending a data packet from an IPv6 domain to an IPv4 domain, said packet comprising an IPv6 destination address of the packet constructed by concatenating an operator prefix, the IPv4 destination address, and a destination port number, said device, on reception of the data packet, making use of:
- means for extracting the IPv4 destination address and the destination port number from the IPv6 destination address;
- means for generating an IPv4 data packet from the IPv6 data packet, said packet including said IPv4 destination address and said destination port number; and
- means for routing the IPv4 data packet to its IPv4 destination.

* * * * *